July 23, 1957 M. J. GEROULO ET AL 2,800,625
VOLTAGE REGULATED POWER SUPPLY
Filed Oct. 16, 1952 2 Sheets-Sheet 1
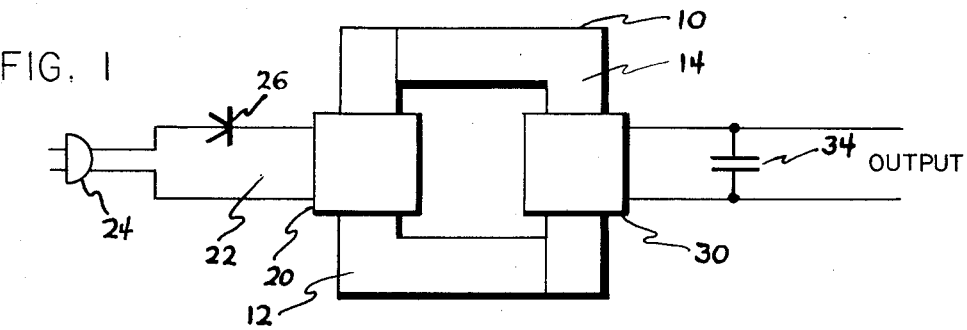
FIG. 1
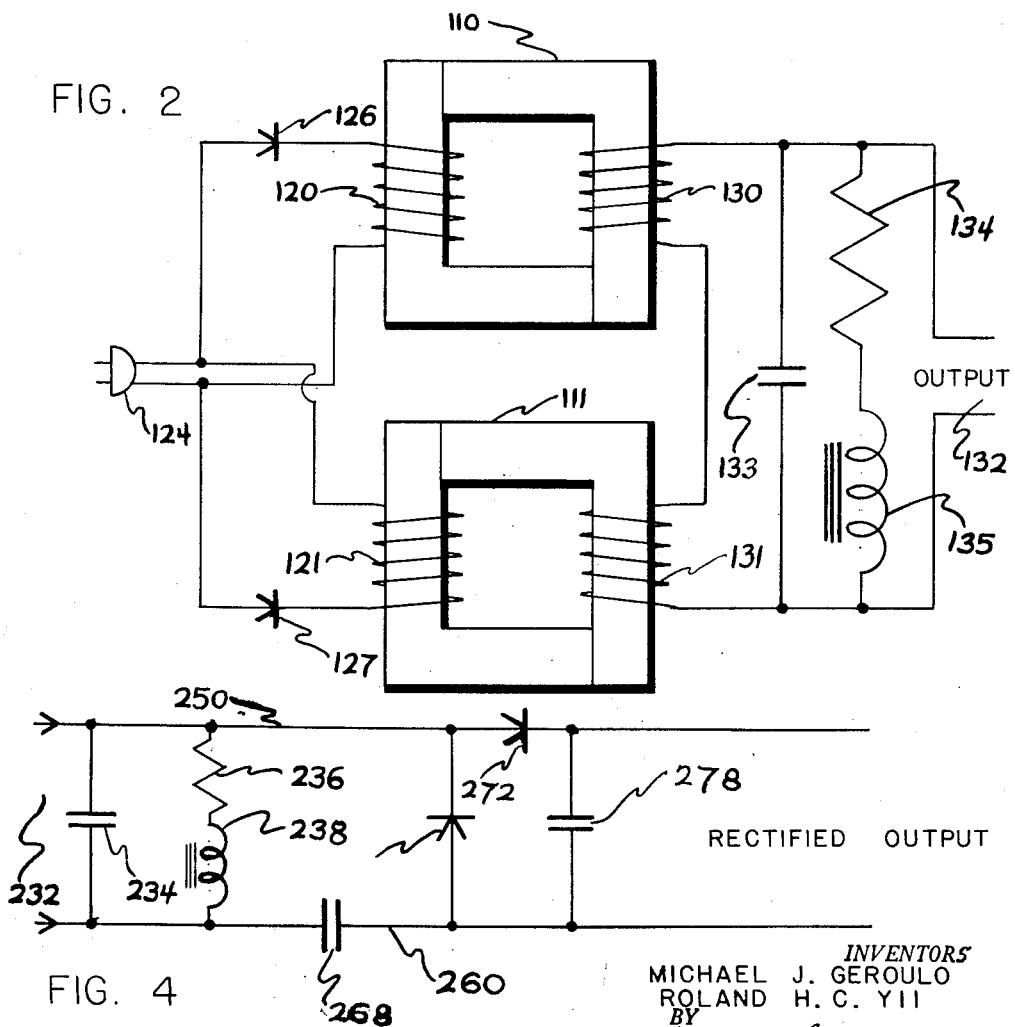
FIG. 2
FIG. 4
INVENTORS
MICHAEL J. GEROULO
ROLAND H. C. YII
BY
*Connolly and Hutz*
THEIR ATTORNEYS

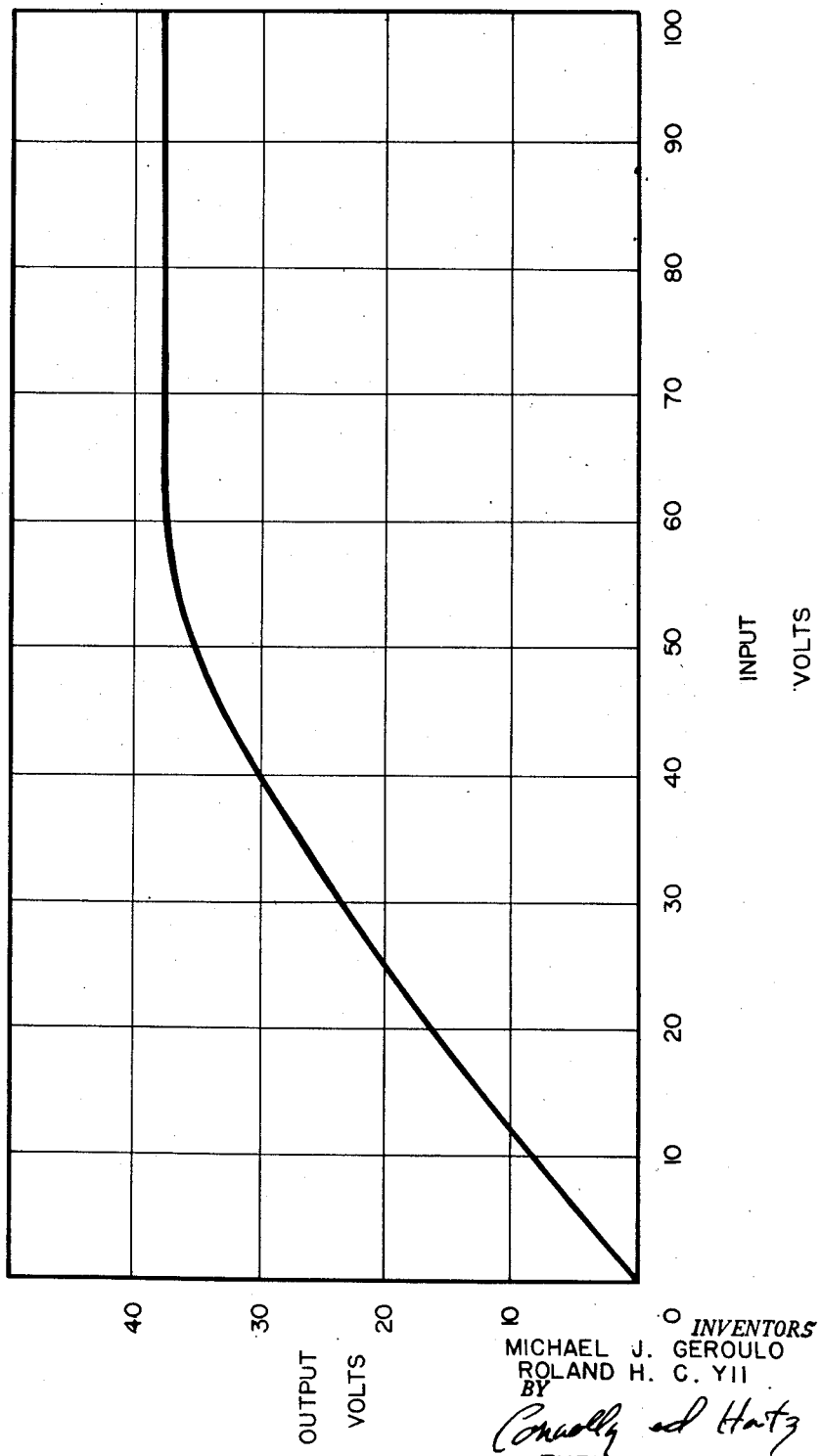

United States Patent Office 2,800,625
Patented July 23, 1957

2,800,625

VOLTAGE REGULATED POWER SUPPLY

Michael J. Geroulo, Williamstown, and Roland H. C. Yii, North Adams, Mass., assignors to Sprague Electric Company, North Adams, Mass., a corporation of Massachusetts Application October 16, 1952, Serial No. 315,016

4 Claims. (Cl. 323—56)

The present invention relates to electric power supplies that deliver currents having voltages that are substantially constant even though the source of the current suffers appreciable change in voltage.

One of the objects of the present invention is the provision of novel power supplies that are relatively simple to manufacture, and do not require specially shaped transformer cores.

The above as well as additional objects of the present invention will be more clearly understood from the following description of several of its exemplifications, considered in conjunction with the accompanying drawings wherein:

Figure 1 is a schematic diagram illustrating a power supply unit according to the present invention;

Figure 2 is a schematic drawing showing a modified form of power supply circuits embodying the present invention;

Figure 3 is a curve diagram showing the operation of a voltage-controlled power supply typical of the present invention; and Figure 4 is a wiring diagram of an output circuit suitable for use in connection with the present invention.

It has been discovered that very effective output voltage regulation can be provided by a power supply having a saturable inductor section, primary and secondary windings linked to said section, alternating current input means including a rectifier connected to supply rectified alternating current in inductor-saturating magnitude to the primary winding, and output means connected to the secondary winding to deliver voltage-regulated half-wave current.

The power supply can also have two of the above types of circuits connected together so that the alternating current from the supply source is divided into positive pulses that pass through one circuit, and negative pulses that pass through the other, the secondary windings being interconnected to deliver a recombined power output current. It is preferred that the interconnection of the secondary windings in this type of circuit be arranged to cause secondary current pulses from the respective inductor sections to generate in the other sections a magnetic flux having the same direction as the primary flux of said other sections. It is preferred to have the elements connected to the secondary winding capacitive as it has been found that the best voltage regulation is obtained when the entire secondary circuit is nearly resonant.

Referring to Figure 1, there is here shown an inductor section 10 assembled from two L-shaped segments 12, 14 suitably held together in any convenient manner. Around one arm of the assembly there is held a primary winding 20, a secondary winding 30 being provided around the same or a different arm as shown. The primary winding 20 is connected with input supply leads 22 and a suitable connector device such as plug 24 can be provided for these leads so that they can be conveniently plugged into a power supply outlet. Rectifier means shown in Figure 1 as a half-wave rectifier 26 is connected in the input circuit to limit the flux generated in the core section 10 by the primary winding, to being unidirectional. The importance of maintaining the flux unidirectional is to reduce heat generation resulting from hysteresis losses and to utilize the phenomena of residual flux to assist in raising the operating point to the desired flux level.

The secondary windings 30 are connected to output terminals 32 from which the voltage regulated output can be delivered to any desired load. To improve the regulation, there can be connected across the output leads a capacitive circuit indicated on Figure 1 by the capacitor 34. It is to be understood that the regulated output from this circuit is the so-called half-wave type.

Only when two circuits of the type shown in Figure 1 are combined in modified form is the output a well-regulated alternating current of the full-wave type. Figure 2 shows such a construction in which two different core sections are indicated at 110, 111. Primary windings 120, 121 on the respective sections are connected in parallel with a supply connector 124. Separate rectifiers 126, 127 are provided in the input supply connections so that the positive pulses of the incoming alternating current are delivered to one winding 120 while the negative pulses are supplied to the other winding 121.

Secondary windings 130, 131 on the respective core sections are connected in series to provide a combined output circuit 132 from which the voltage regulated output currents can be taken. The excellent regulation is obtained by inclusion of capacitor 133, resistor 134, inductor 135 and the load must be capacitive and when combined with secondary windings 130, 131 for best regulation must be near resonance for the input frequency. The regulated output voltage is now independent of the nature of the load.

In the above constructions the core sections and primary windings are correlated so that the cores become magnetically saturated when the supply current is delivered at a voltage somewhat below the normal value. By way of example this saturation point can be selected at 50 to 75% of the normal voltage. This will give good regulation at all supply voltages higher than the incipient saturation voltage. The secondary windings are selected with a number of turns that gives the desired output voltage, whether this be equal to, higher or lower than the supply voltage.

It is preferred that secondary windings in the construction of Figure 2 be connected so that the current induced by each core section develops in the other section a magnetic flux directed in the same direction as the flux developed by the primary windings of said other section. This is indicated in Figure 2 where the winding directions of the separate windings are schematically shown. The same results can be obtained, however, if both the primary and secondary windings of one core section are reversed in direction, or if the primary windings, the secondary windings, or both of these windings in both core sections are changed in direction.

By way of example, with core sections 110, 111 of identical construction, each formed of molded manganese-zinc ferrite (on a mol percent basis the concentrations are manganese:zinc:iron::29:18:52) having a transverse cross section of 2.04 square centimeters, with the capacitance-inductance-resistance combination connected across the output circuit as in Figure 2 and with the following circuit constants:

Primary windings—3000 turns each
Secondary windings—2000 turns each
Capacitance—3 microfarads
Inductance—7 henries
Resistance—10,000 ohms A controlled voltage output was obtained as shown in Figure 3. It will be noted that the output voltage is held within a very limited range, while the input potential changes by 60 volts.

Similar operation is obtained when other types of inductor materials are used in place of the above-described ferrite. Other ferrites and plain iron, ferrosilicon laminations, or even powdered iron cores can be substituted without significantly affecting the voltage controlling characteristics. In all cases, however, the core dimensions should be adjusted for the particular saturation characteristics of the specific core that is used.

Instead of supplying the voltage regulated A. C. output directly to a desired utilizing circuit, the voltage regulated output can be rectified or otherwise modified to give any other desired form of power, while still retaining controlled voltage characteristics. Thus the output leads 32 or 132 can be connected to a rectifying circuit where the current is converted to direct current and the direct current then delivered to a load with or without filtering. Rectifying circuits so utilized can be of the half wave or full wave type, and can also be of the voltage doubling, tripling, quadrupling, etc., type, all of which are well-known. In addition, voltage doubling or quadrupling rectifier assemblies can be of the balanced type having output leads neither of which are directly connected with the leads carrying the alternating current to be rectified, or they can be of the unbalanced type where one of the output leads is directly connected in the above manner. Unbalanced voltage doublers of this type are particularly suited for use with radio and television receivers and transmitters, inasmuch as they provide a better ground return connection by way of the directly connected leads.

Figure 4 shows a rectification network suitable for connection to the output of Figure 2. The output leads 232 correspond to the leads 132 in the construction of Figure 2, and have the network of capacitor 234, resistor 236 and inductor 238 suitably connected across them as shown. From this network a positive lead 250 and a negative lead 260 extend to a first rectifier 270. In series in the lead 260 is a charging capacitor 268. Beyond rectifier 270 there is connected in series in lead 250 a second rectifier 272, after which the positive and negative leads are bridged by a second charging capacitor 278. From this second charging capacitor there can be directly taken a rectified output of good voltage-controlled characteristics. If desired, however, additional filter circuits of the series-inductance parallel-capacitance type or series-resistance parallel-capacitance type, or of any other type can be connected in the rectified output leads.

By reason of the manner in which charging capacitor 268 is connected in the circuit of Figure 4, a definite D. C. polarity exists between the leads 232, the lead directly connected to capacitor 268 being more positive than the other. Accordingly, there can be used as capacitance 234 an electrolytic capacitor designed for operation at a voltage as low as that at which capacitor 268 becomes charged. Capacitors 268, 278 and any additional capacitance used in supplemental filtering networks, can of course also be of the electrolytic capacitor type.

In the combination of the capacitance, inductance and resistance shown bridged across the voltage control alternating current output in Figure 2, the individual elements are subject to considerable variation providing that they form a nearly resonant circuit with the secondary windings.

It is not essential to have the two core sections 110, 112 with the construction of Figure 2 operating in directly opposite (180°) phase relationship. A difference in phase of even 20 to 30 degrees provides significantly better operation than the core circuit of the construction of Figure 1. Such phasing can be accomplished by connecting one primary through a phase-shifting circuit to the output of the same rectifier (26 or 126) used to supply the other primary. The phase shifting, when used, need not be duplicated in the secondary winding connections.

The particular shape of the saturable cores, both in transverse and in plan views, is not significant and can be changed in any desired manner. By way of example standard "E" and "I" laminations can be used with both primary and secondary windings mounted on the central leg of the "E." Other shapes are also effective.

As many apparently widely different embodiments of this invention may be made without departing from the spirit and scope hereof, it is to be understood that the invention is not limited to the specific embodiments hereof except as defined in the appended claims.

What is claimed is:

1. A voltage regulating apparatus having a pair of saturable inductance core sections, primary and secondary windings on each of the sections, unidirectional supply means connected to supply saturating pulses of direct current to each of the primary windings in out-of-phase relation, and the secondary windings being interconnected to deliver an alternating current output having a regulated voltage.

2. The combination of claim 1 in which the secondary windings are connected to cause the secondary pulses of the respective section to generate in the other sections a magnetic flux having the same direction as the primary flux of said other sections.

3. The invention of claim 1 in which the secondary windings are connected to a pair of output leads bridged by a series-connected resistor and inductor combination, and by a capacitor in parallel with this combination.

4. The combination of claim 1 in which the core sections are manganese zinc ferrite.

References Cited in the file of this patent

UNITED STATES PATENTS

| 1,921,786 | Suits | Aug. 8, 1933 |
| 2,021,754 | Suits | Nov. 19, 1935 |

FOREIGN PATENTS

| 292,770 | Italy | Aug. 14, 1930 |

OTHER REFERENCES

Pub.: "Saturated Core Devices," by Leonard R. Crow, 1949, published by the Scientific Book Publishing Company of Vincennes, Ind.